United States Patent [19]
Demachi et al.

[11] Patent Number: 4,781,465
[45] Date of Patent: Nov. 1, 1988

[54] DEVICE FOR DETECTING ROAD SURFACE CONDITION

[75] Inventors: Atushi Demachi; Fumitaka Takahashi, both of Tokyo; Katsutoshi Tagami, Saitama; Shigeto Nakayama, Tokyo, all of Japan

[73] Assignee: Honda Giken Kogyo Kabushiki Kaisha, Tokyo, Japan

[21] Appl. No.: 5,387

[22] Filed: Jan. 9, 1987

Related U.S. Application Data

[63] Continuation of Ser. No. 681,545, Dec. 14, 1984, abandoned.

[30] Foreign Application Priority Data

Dec. 23, 1983 [JP] Japan ............................ 58-248843
Dec. 28, 1983 [JP] Japan ............................ 58-251741
Dec. 28, 1983 [JP] Japan ............................ 58-251742

[51] Int. Cl.⁴ .................................................. G01B 11/30
[52] U.S. Cl. ........................................ 356/371; 356/4
[58] Field of Search ................... 356/376, 1, 371, 4; 180/167, 169

[56] References Cited

U.S. PATENT DOCUMENTS

| 4,040,738 | 9/1977 | Wagner | 356/1 |
| 4,456,829 | 6/1984 | Fohey | 356/1 |
| 4,541,723 | 9/1985 | Pirlet | 356/376 |
| 4,632,543 | 12/1986 | Endo | 180/167 |

FOREIGN PATENT DOCUMENTS 0231404 12/1984 Japan ................... 356/376

Primary Examiner—R. A. Rosenberger
Assistant Examiner—Crystal Cooper
Attorney, Agent, or Firm—Lyon & Lyon

[57] ABSTRACT

A device for detecting road surface condition in front of a running car by radiating a directional beam or beams onto a point or points on the road surface at predetermined distance or distances in front of the car body and receiving the reflected beam or beams from said point or points, and determining the road surface condition based on the measurement of the distance or distances.

3 Claims, 4 Drawing Sheets

DEVICE FOR DETECTING ROAD SURFACE CONDITION

This application is a continuation of application Ser. No. 681,545, filed Dec. 14, 1984 now abandoned.

FIELD OF THE INVENTION

The present invention relates to a device for detecting uneven condition of a road surface in front of a running car.

PRIOR ART

Recently, a system for adjusting strength of a suspension of a car in accordance with concaves or convexes on a road surface has been developed. The suspension adjusting system according to this prior art is so constructed that the uneven condition of the road surface is detected by means of a vibration sensor or the like to produce a detection signal, and the signal thus produced is fed back to the suspension to control the strength thereof. This system has a defect in that there is necessarily a delay in controlling the strength of the suspension in accordance with the uneven condition of the road surface.

OBJECT OF THE INVENTION

The present invention aims at avoiding such defect in the prior art.

It is a first object of the present invention to provide a device for detecting road surface condition in which the uneven condition of the road surface in front of the running car is predicted so that the suspension or other car-weight supporting mechanism can be controlled in optimum manner, without involving delay in control owing to feed-forward.

It is a second object of the present invention to provide an optical distance measuring means which is very advantageously used in the device for detecting road surface condition in front of a running car.

SUMMARY OF THE INVENTION

With the first object as mentioned above, the present invention provides a device for detecting road surface condition in front of a car, which comprises means for measuring length of distance by radiating a directional beam onto a point on the road surface at a predetermined distance in front of the car and then receiving the beam reflected from said point and means for deciding the uneven conditions of the road surface on the basis of the result of measurement of said length of distance.

Furthermore, with the second object as mentioned above, the present invention provides a device for detecting road surface condition in front of a running car, in which the means for measuring length of distance comprises a beam generator for radiating a directional light beam, an optical position sensor including a plurality of photoelectric transducer elements arranged on an optical axis for receiving the light beam radiated, modulated and then reflected from the road surface through a light receiving lens, an amplifier and demodulator for amplifying and demodulating the output of said sensor and an encoder for encoding the output position of said demodulated signal in said sensor.

BRIEF DESCRIPTION OF THE DRAWINGS

Now the invention will be explained with reference to the drawings, in which.

DESCRIPTION OF THE PREFERRED EMBODIMENTS

Figure 1:
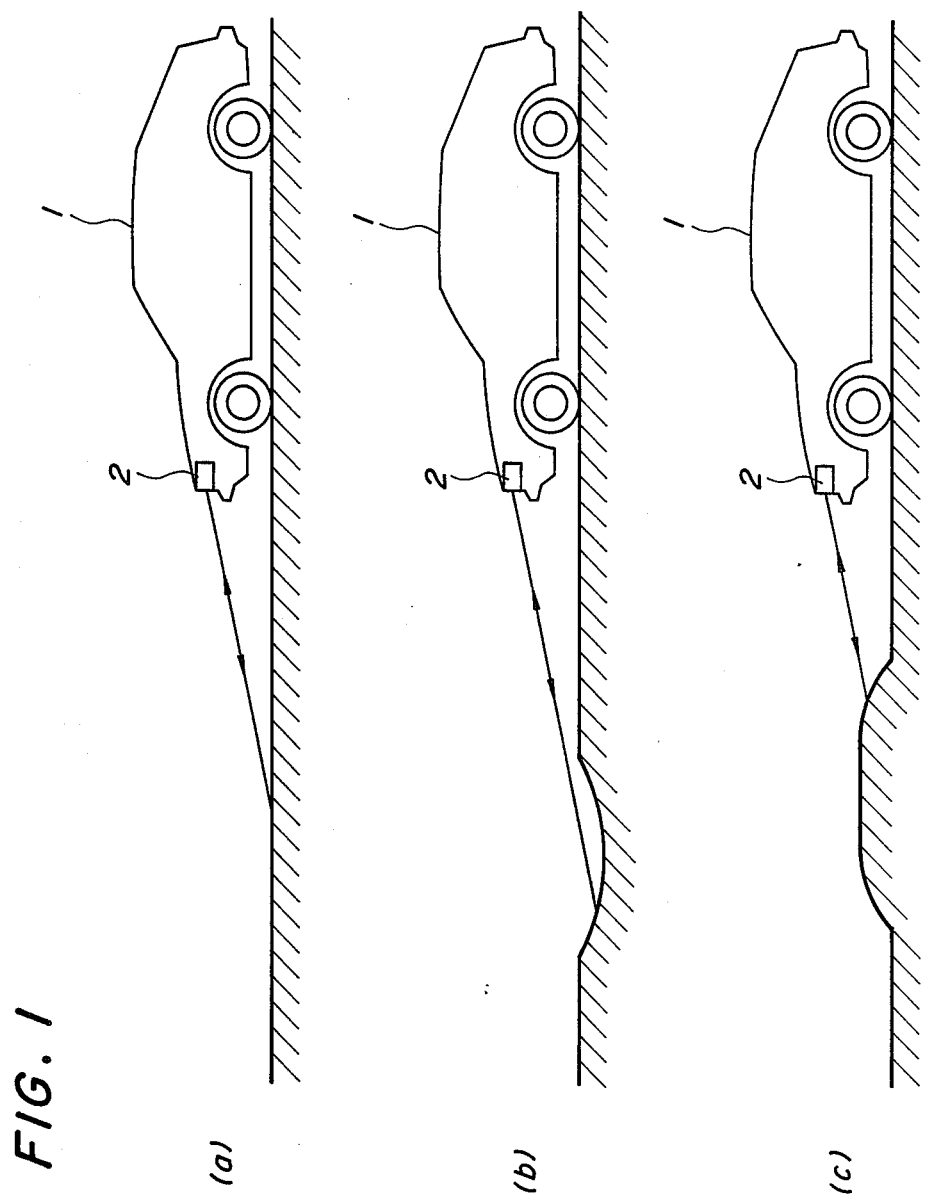
FIGS. 1a, b and c illustrate the principle of detection of road surface condition in front of a car according to an embodiment of the present invention.

FIG. 1 illustrates the principle of detection of road surface condition in front of a car effected by the device according to the present invention. The device according to the present invention comprises an optical distance sensor 2 arranged on the front side of a car 2 to measure the length of distance by trigonometrical survey method, said sensor including a light emitting part for radiating a directional laser beam onto a point on the road surface at predetermined distance in front of the car and a light beam receiving part for receiving the directional laser beam reflected from said point, and means for detecting the uneven condition of the road surface whereby the road surface in front of the car is decided as a flat surface (FIG. 1a), a concave surface (FIG. 1b) and a convex surface (FIG. 1c) when the length of distance measured by the distance sensor 2 is constantly equal to, longer than and shorter than a predetermined length, respectively.

Figure 2:
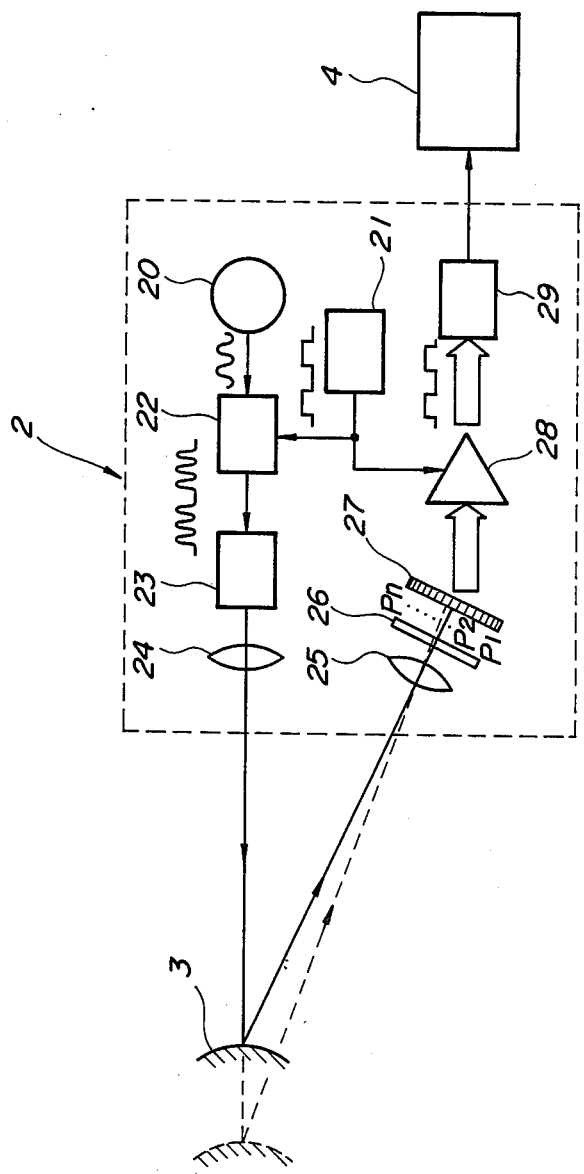
FIG. 2 is a block diagram showing an example of the construction of the device according to the same embodiment.

FIG. 2 illustrates the device for detecting surface condition of a road surface in front of a car according to the present invention, which comprises an optical distance sensor 2 for measuring a distance between the light emitting part and a target (in this case, a road surface) by emitting a directional laser beam in a predetermined direction toward the target and receiving the beam reflected from the target, and a circuit 4 for deciding the road surface condition on the basis of the result of the measurement of the distance.

The optical distance sensor 2 comprises a laser driving portion including a power source 20 for producing a laser driving signal, a pulse signal generator 21 for producing pulse signals having constant period, a modulator 22 for modulating said laser driving signal with said pulse signals, a laser emitter (semiconductor laser) 23 driven by the modulated signal and a collimator lens 24 to radiate a modulated, directional laser beam; an optical position sensor 27 including an array of a plurality of photoelectric transducer elements such as photodiode CCD or the like into which the modulated beam reflected by the target 3 is passed through a receiving lens 25 and an optical filter 26; an amplifier and demodulator 28 for amplifying the time series of signals fed out of said optical position sensor 27; and an encoder 29 for encoding what is number of the transducer element of the optical position sensor 27 from which the demodulated signal has been fed out and producing an output of data corresponding to the distance between the target 3 and the beam emitting part. The optical position sensor 27 includes an array of a plurality of photoelectric transducer elements P1~Pn arranged in a line normal to the optical axis. These elements are so arranged that the position of the photoelectric transducer elements which receives the reflected beam varies in accordance with the variation of the distance between the target 3 and the beam emitting part.

In the optical distance sensor 2 as constructed above, the directional beam is modulated and radiated from the laser generator 23 through the collimator lens 24 in the predetermined direction, and said beam is reflected by the target 3. The reflected beam is selectively received by the optical position sensor 27 through the receiving lens 25 and the optical filter 26 which serves to pass only light signal having a specific frequency band. The position where the optical position sensor 27 receives the beam reflected from the target 27 varies, depending upon the length of the distance between the collimator lens 24 and the target 3, as shown in the drawing. Accordingly, it is possible to detect the distance between the target 3 and the light emitting part by feeding the time series of signals read out from the photoelectric transducer elements P1~Pn of the optical position sensor 27 to the encoder 29 through the amplifier and demodulator 28 and then having the encoder determine the number of the photoelectric transducer element Pi (i=1~n) from which the particular demodulated signal has been produced. Thus, the device according to the present invention is constructed to radiate a modulated laser beam from its light emitting part and then receive the reflected laser beam from the target 3 by its light receiving part which demodulates said modulated beam, thereby effecting the distance measurement and, consequently, this device is not subjected to the influence of any disturbing light. Furthermore, the device according to the present invention employs a linear arrangement of photoelectric transducer elements as its optical position sensor 27 and consequently said device can measure the distance between the light emitting part and the target 3 with high accuracy even by beam output of relatively low power.

The device according to the present invention, which is constructed as explained above, can be used in such manner that the optical distance sensor 2 is mounted on the front of the car 1 to radiate a modulated laser beam onto a point on the road surface at a predetermined distance in front of the car, then receive the beam reflected from said point and apply amplifying, demodulating and encoding treatments to said modulated beam to effect measurement of the length of distance. Thus, the uneven condition of the road surface in front of the car 1 can be detected by the surface condition deciding circuit 4 on the basis of the data concerning the measurement of distance.

Figure 3:
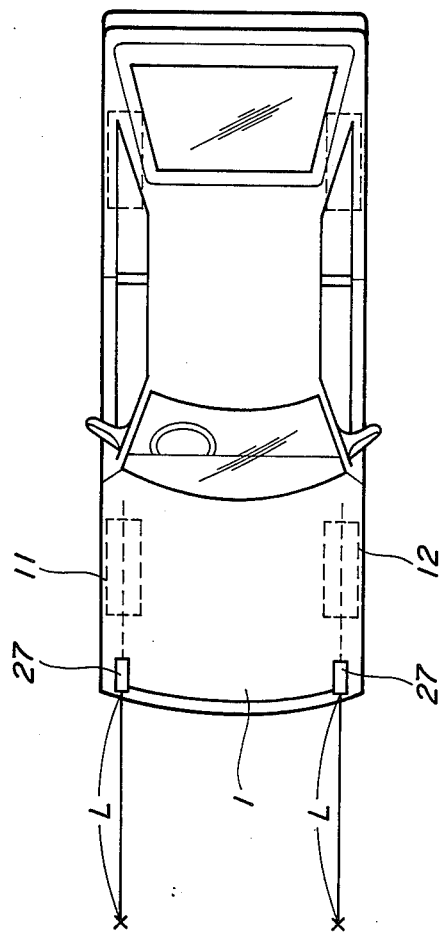
FIG. 3 illustrates an example of the detection of the uneven condition of road surface in front of a car which is carried out on an actual car.

FIG. 3 illustrates an example in which two optical distance sensors 2 are mounted on the front of a car 1 at the positions corresponding to two tyres 11 and 12 of the front wheel, respectively, to radiate beams to the points X on the road surface corresponding to the respective tyres 11 and 12 at a predetermined distance L in front of the car 1, whereby the uneven conditions of the road surface at the left and right sides in front of the car are decided by the circuit 4 on the basis of the data of measurement. Thus, it is possible to separately detect the uneven conditions of the road surface at the positions where the left and right tyres 11 and 12 are going to pass. Accordingly, it is possible to separately effect feed-forward control of the strength of the left and right suspensions of the car 1 in accordance with the states of detection at the left and right tyres. In this case, it is, of course, possible to provide a single distance sensor 2 of optical type to commonly effect the strength adjustment of the left and right suspensions.

Such a common adjustment of strength of left and right suspensions may be attained by preparing a suspension-strength adjusting signal corresponding to the result of decision made by the circuit 4 and feeding said signal to an actuator for actuating a strength adjusting mechanism. The circuit 4 for deciding road surface condition may include a microcomputer. In addition to the suspension-strength adjustment, a microcomputer can be used to effect feed-forward control in which when the uneven condition of the road surface is detected a car-speed signal is produced from a car-speed sensor and a proper braking command corresponding to the car-speed signal is applied to an actuator of an automatic braking mechanism to decrease the car-speed. It is also easily possible to provide a means for automatically stopping the emision of laser beam of the optical distance sensor 2 when the car 1 is stopped. It is, of course, possible to use a distance sensor in which radio wave, ultra sonic wave or the like other than laser beam is utilized.

Figure 4:
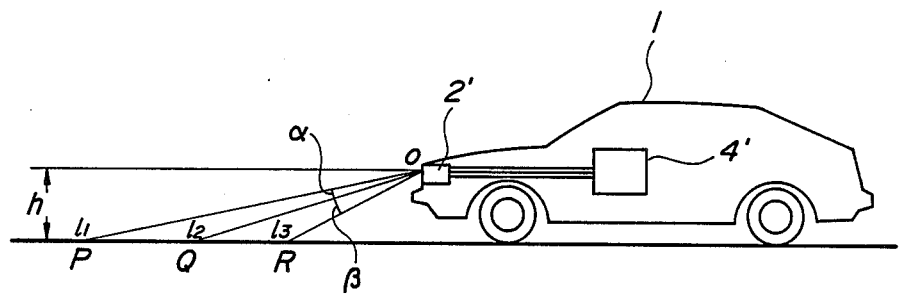
FIG. 4 is a schematic diagram showing another embodiment of the device according to the present invention.

FIG. 4 shows another embodiment in which an optical distance sensor 2' is mounted on the front of the body of a car 1 and said sensor 2' is constructed to radiate at least three laser beams directed at different angles toward points P, Q and R situated on a same line on the road surface in front of its running direction of the car 1, thereby making distance measurement of the distances between O and P, O and Q, and O and R, respectively. A circuit 4' for deciding road surface condition is mounted in the car 1 to make arithmetic operations on the basis of the measured distances $l_1$, $l_2$ and $l_3$ between O and P, O and Q, and O and R, to detect the uneven condition of the road surface in front of the car.

In the arrangement as shown in FIG. 4, if the road surface is flat, the point P, Q and R are situated on a straight line and the height h of the laser beam source O on the road surface remains constant. Under such circumstances, relation exists as expressed by the following equation.

$$\frac{\overline{QR}}{\overline{PQ}} = \frac{\Delta OQR}{\Delta OPQ} \tag{1}$$

The following equation is deduced from the relation expressed by the equation (1).

$$\frac{(l_2^2 + l_3^2 - 2l_2l_3 \cos\beta)^{\frac{1}{2}}}{(l_1^2 + l_2^2 - 2l_1l_2 \cos\alpha)^{\frac{1}{2}}} = \frac{l_2l_3 \sin\beta}{l_1l_2 \sin\alpha} \tag{2}$$

In practice, each of the differences in angle $\alpha$ and $\beta$ between the respective laser beams is selected to be smaller than 5°. Accordingly, it may be assumed that $\cos \alpha = \cos \beta = 1$, and thus the equation (2) can be changed as follows.

$$2l_1l_3 = l_2(l_1 + l_3) \tag{3}$$

Thus the equation (3) indicates the state of flat road surface in front of the car.

Figure 5:
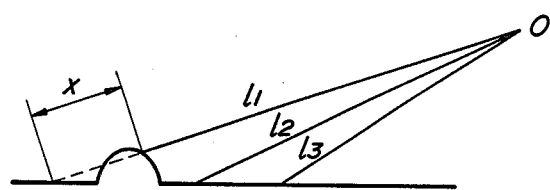
FIG. 5 is a diagram showing an example of the state of the beam which acts to detect the flatness of the road surface in front of the car according to the embodiment shown in FIG. 4.
Figure 6:
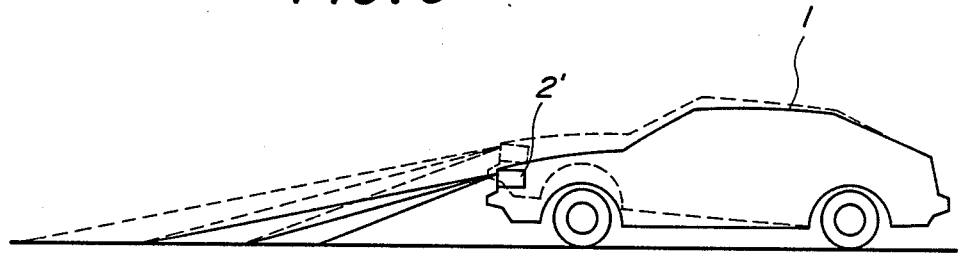
FIG. 6 is a diagram showing the state of change of the radiated beam during pitching movement of the car in the embodiment shown in FIG. 4.

FIG. 5 shows the state of the beam when the flatness of the road surface is detected. The arithmetic operation is effected by the circuit 4', on the basis of the distances $l_1$, $l_2$ and $l_3$ measured by the optical distance sensor 2'. The flatness of the road surface is so decided that if X equals 0 the rod surface is flat, and if x does not equal 0 the road surface is uneven. Even if variation is caused in angle and height of the radiated beams relative to the road surface owing to the pitching movement of the car moving on the road surface, as shown in FIG. 6, no variation is caused thereby in the relative positions of the respective beams, so that the detection of flatness in front of the car is not subjected to the influence of the pitching movement of the car.

Thus, the device according to the present invention makes it possible to effect continuous detection of the uneven condition of the road surface in front of the car 1 during running thereof, so that it can be effectively used to control the suspension or the like of the car 1 when a juncture, small stone or the like accidentally existing on the paved road surface is detected.

The optical distance sensor 2' may consist of three sets of the optical distance sensors 2 as shown in the embodiment as hereinbefore explained.

In the device for detecting road surface condition in front of a car according to the second embodiment, the more beams emitted from the optical distance sensor 2', the higher is the accuracy of detection of flatness of road surface. It is also easily possible to provide a means for scanning a single laser beam at high speed in the front direction of the running car 1 to sequentially measure the distances between a plurality of points on the road surface and the beam emitting position, instead of the sensor 2' for emitting a plurality of laser beams at the same time. It is further possible to provide a microcomputer which serves to fulfil the function of the circuit 4' for determining the road surface condition. Additional functions such as the function of automatically stopping the emission of laser beam of the optical distance sensor 2' when the stop of the car is detected on the basis of the signal fed from the car-speed sensor may be added thereto.

It will be understood that the present invention provides a device for detecting road surface condition in front of a running car, in which a directional beam is radiated onto a point on the road surface at a predetermined distance in front of the car body and said beam reflected from said point is received to measure the length of the distance whereby the uneven condition of the road surface is determined on the basis of the result of the measurement of the distance. This device has a super advantage in that it makes it possible to predict the uneven condition of the road surface in front of the running car, so that the control of suspension or other mechanism can be effected in optimum manner, without any delay owing to feed-forward.

We claim:

1. A device for detecting road surface condition in front of a car, comprising: distance measuring means including means for emitting directional beams from a beam source arranged at a predetermined height above a road surface, said directional beams being directed at predetermined different radiating angles relatively to a horizontal line, thereby irradiating at least three points on a line on the road surface in front of the car in its running direction and means for receiving the respective beams which have been reflected from the road surface for thereby measuring the respective distances between the respective irradiated points and the beam source; and means for effecting a predetermined arithmetic operation and for deciding from said arithmetic operation whether a flat condition of the road surface on said line is met or not on the basis of data concerning the distances of said at least three measured points, thereby determining uneven condition of the road surface in front of the car.

2. A device for detecting road surface condition in front of a car according to claim 1 in which the distance measuring means is capable of emitting and scanning a single beam in the running direction in front of the car body.

3. A device for detecting road surface condition in front of a car according to claim 1, in which the distance measuring means comprises a beam generator for emitting a directional light beam, a modulator for modulating said radiated beam, an optical position sensor including a plurality of photoelectric transducer elements arranged on an optical axis to receive the modulated beam reflected by a target and passed through a receiving lens, an amplifier and demodulator for amplifying and demodulating the output of said sensor, and an encoder for encoding the position of the output of said amplified and demodulated output signal in said sensor.

* * * * *